(12) United States Patent
Zhang et al.

(10) Patent No.: US 10,174,889 B2
(45) Date of Patent: Jan. 8, 2019

(54) LED BAR LIGHTING WITH UNIFORM ILLUMINATION

(71) Applicants:Self Electronics Co., Ltd., Ningbo, Zhejiang (CN); Wanjiong Lin, Ningbo, Zhejiang (CN); Self electronics USA Corporation, Norcross, GA (US)

(72) Inventors: Chengke Zhang, Zhejiang (CN); Zuping He, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 15/629,674

(22) Filed: Jun. 21, 2017

(65) Prior Publication Data

US 2017/0370538 A1    Dec. 28, 2017

(30) Foreign Application Priority Data

Jun. 22, 2016    (CN) .......................... 2016 1 0465445

(51) Int. Cl.
| | |
|---|---|
| *F21S 4/00* | (2016.01) |
| *F21S 4/28* | (2016.01) |
| *H05B 33/08* | (2006.01) |
| *F21V 5/00* | (2018.01) |
| *F21V 5/04* | (2006.01) |
| *G02B 3/04* | (2006.01) |
| *G02B 3/06* | (2006.01) |

(Continued)

(52) U.S. Cl.
CPC ................ *F21S 4/28* (2016.01); *F21V 5/007* (2013.01); *F21V 5/04* (2013.01); *G02B 3/04* (2013.01); *G02B 3/06* (2013.01); *H05B 33/0803* (2013.01); *F21Y 2103/10* (2016.08); *F21Y 2115/10* (2016.08)

(58) Field of Classification Search
CPC .............. F21Y 2115/10; F21Y 2103/10; F21Y 2105/10; F21Y 2113/00; F21Y 2113/13; F21V 5/04; F21V 15/013; F21V 13/04; F21V 3/02; F21V 5/02; F21V 23/007; F21V 7/005
USPC ........................................................ 362/611
See application file for complete search history.

(56) References Cited

U.S. PATENT DOCUMENTS

| | | | | |
|---|---|---|---|---|
| 9,016,892 | B1 * | 4/2015 | Scribante | F21V 29/763 362/222 |
| 9,683,725 | B2 * | 6/2017 | Scribante | F21V 17/002 |
| 9,822,951 | B2 * | 11/2017 | Lu | F21V 13/04 |

(Continued)

*Primary Examiner* — Thien M Le
(74) *Attorney, Agent, or Firm* — Wang Law Firm, Inc.

(57) ABSTRACT

An LED bar lighting with uniform illumination includes at least two LED chips, and a bar lens. Each of at least two LED chips includes an optical axis. The bar lens includes an in-light surface profile line and an out-light surface profile line in a cross section perpendicular to the axial direction of the bar lens. The in-light surface profile line includes a first arc and tow second arcs arranged two sides of the first arc. The first arc is tangent to the second arc and the radius of the first arc is smaller than that of the second arc. The radius of the out-light surface profile line is gradually reduced toward two sides thereof from an intersection of the out-light surface profile line and the optical axis. The radius of the out-light surface profile line at the intersection of the out-light profile line and the optical axis is infinite, and the refraction angle at both end points of the out-light surface profile line is 0 degree.

8 Claims, 3 Drawing Sheets

(51) Int. Cl.
*F21Y 103/10* (2016.01)
*F21Y 115/10* (2016.01)

(56) References Cited

U.S. PATENT DOCUMENTS

2008/0100773 A1* 5/2008 Hwang ................... G02B 3/005
                                                          349/62
2014/0078727 A1* 3/2014 Lu .......................... F21V 15/013
                                                          362/225
2014/0347849 A1* 11/2014 Xu ......................... F21V 23/007
                                                          362/217.17

* cited by examiner

LED BAR LIGHTING WITH UNIFORM ILLUMINATION

RELATED APPLICATION

This present application claims benefit of the Chinese Application, CN201610465445.6, filed on Jun. 22, 2016.

BACKGROUND

1. Technical Field

The present application relates to a lighting device, and more particularly to an LED bar lighting with a uniform illumination.

2. Description of the Related Art

Light emitting diode (LED) is growing in popularity due to decreasing costs and long life compared to incandescent lighting and fluorescent lighting. Recently, a number of LED lighting apparatuses have been designed to replace the halogen apparatus, as well as other traditional incandescent or fluorescence lighting apparatuses. In some places such as exhibition halls, jewelry stores, museums, supermarkets, and some home lighting, such as large villas, will use a lot of strip LED lamps. Moreover, in addition to lighting equipments, such as general traffic lights, billboards, motor-lights, etc., also use light-emitting diodes as light source. As described above, for the light-emitting diodes as a light source, the advantage is power saving, and the greater brightness. Therefore, the use has been gradually common.

With the use of the large number of LED lamps, especially LED bar lightings, the real requirements of user is further closed in home or business areas of the lighting. However, the LED chip used in the LED bar lighting is close to a point light source so that it is difficult to obtain a uniform illumination on the luminous area illuminated by the LED bar lighting. Generally, the middle of the luminous area is strong brightness and both sides thereof are dark, which make the luminous area not beauty. Now, one solution is to increase the number of the LED chips, such as setting two rows of LED chips, or more rows. However, this method increase the cost of the entire LED lighting, especially in some occasion, it is no need so much brightness. Only for obtaining uniform illumination to increase the cost and manufacturing difficulty, it will often lose the competitiveness of the LED bar lightings.

Therefore, it is necessary to provide an LED bar lighting with a uniform illumination which makes it possible to decrease the cost.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The present application is illustrated by way of example and not by way of limitation in the figures of the accompanying drawings. It should be noted that references to "an" or "one" embodiment in this application are not necessarily to the same embodiment, and such references mean at least one.

Figure 1:
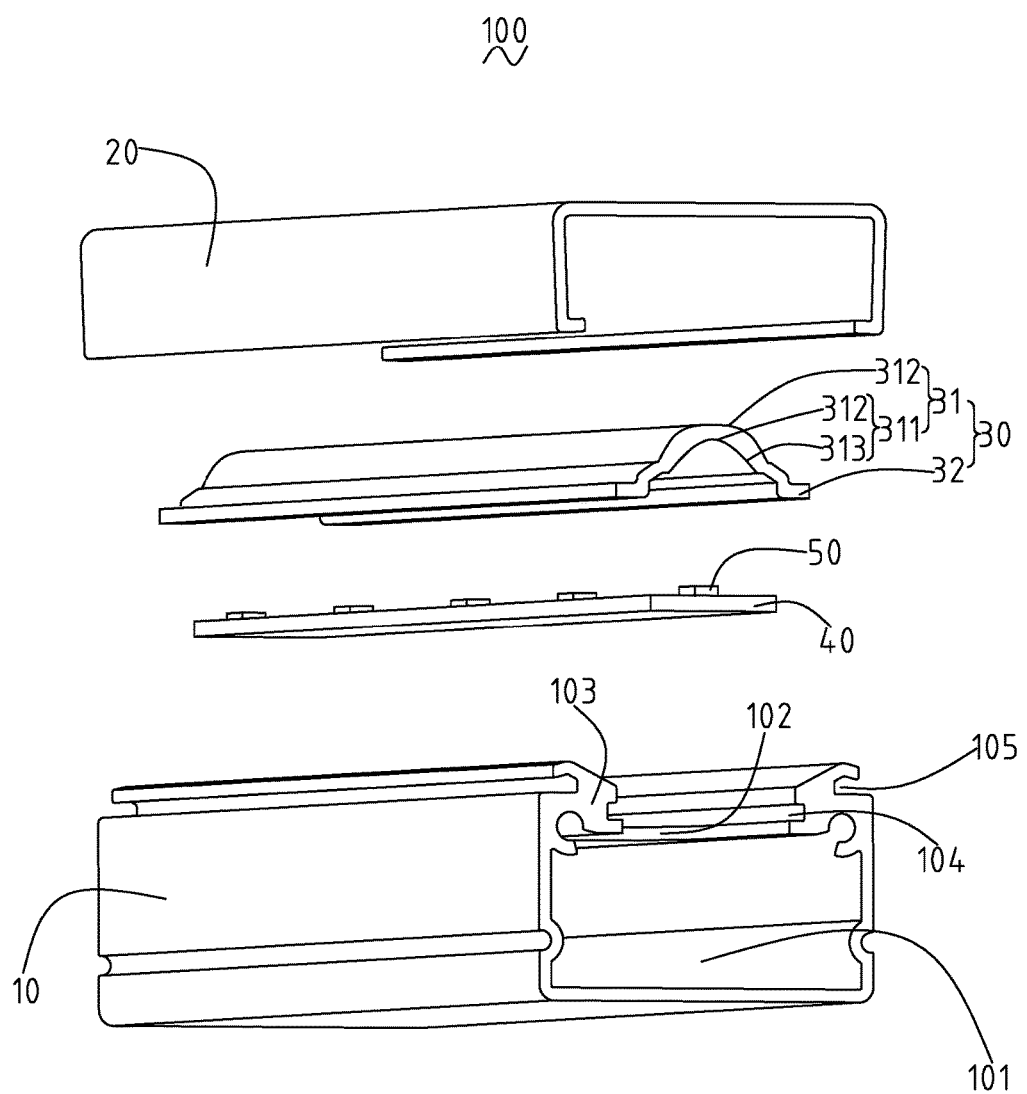
FIG. 1 is an exploded view of an LED bar lighting with a uniform illumination according to an embodiment.
Figure 2:
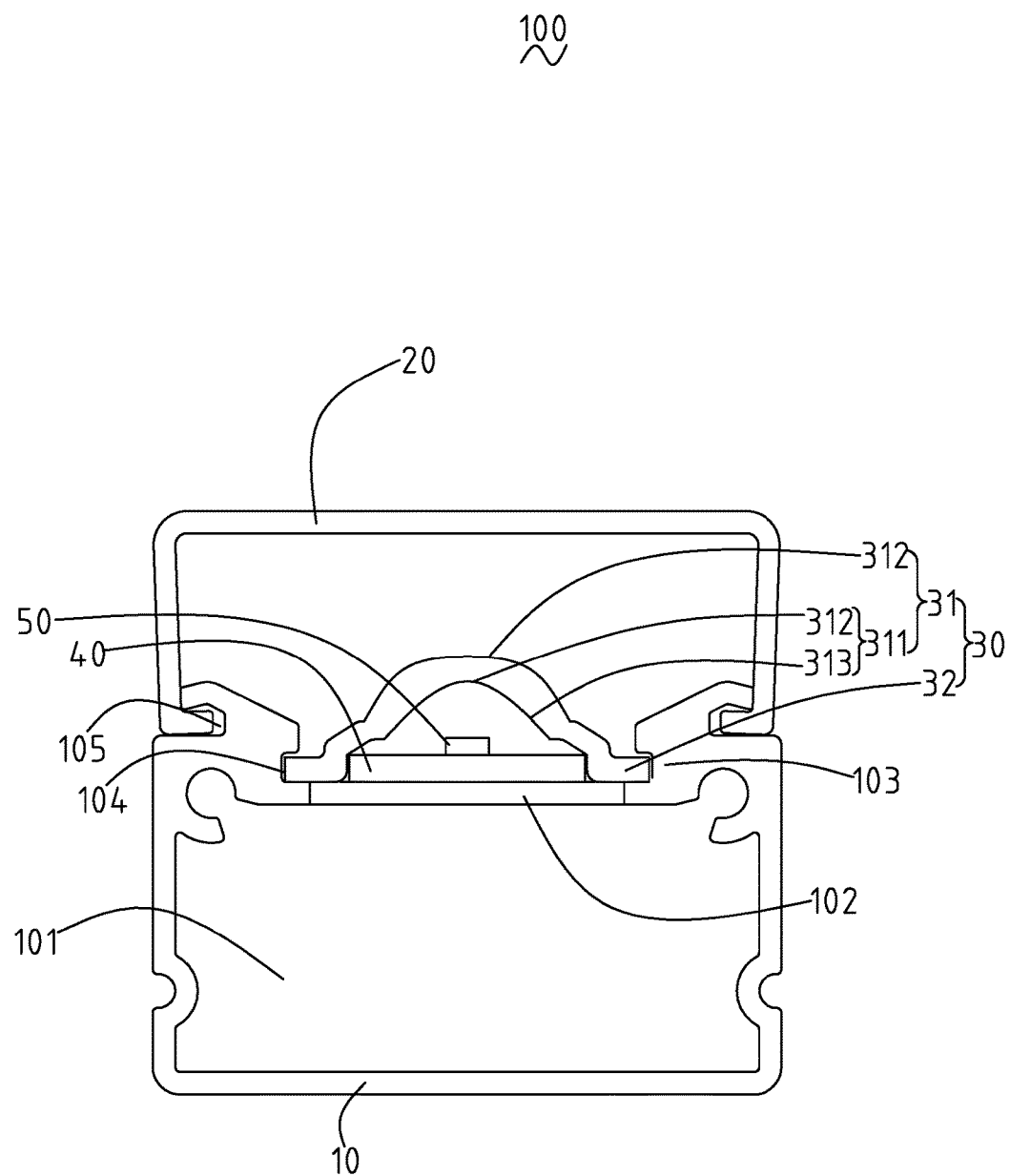
FIG. 2 is a cross sectional view of the LED bar lighting with a uniform illumination of FIG. 1.
Figure 3:
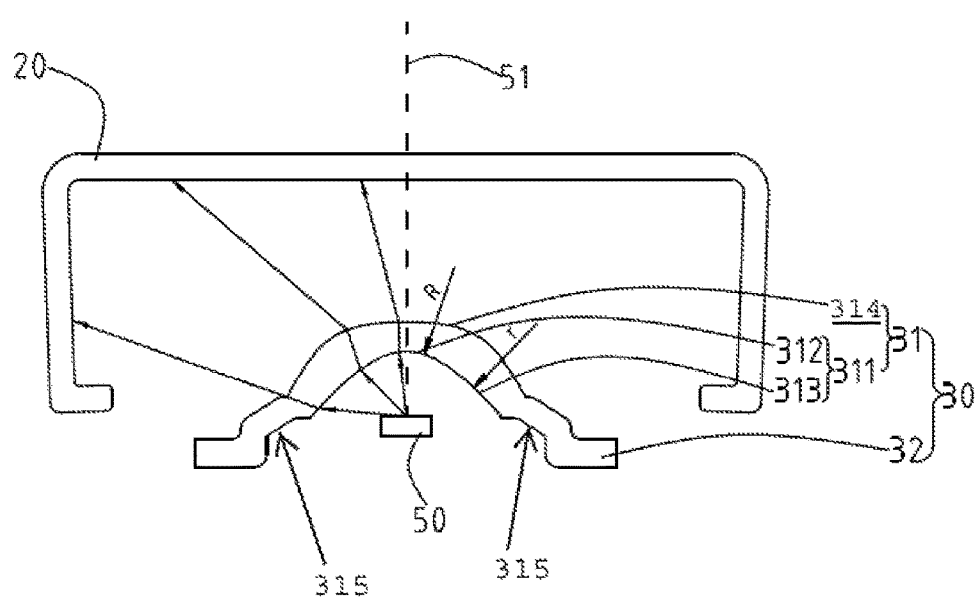
FIG. 3 is a light path diagram of the LED bar lighting with a uniform illumination of FIG. 1

Referring to FIG. 1 to FIG. 3, an LED bar lighting 100 with uniform illumination is shown. The LED bar lighting 100 with uniform illumination includes a bar house 10, a cover 20 mounted on the bar house 10, a bar lens 30 disposed on the bar house 10, a circuit board 40 arranged on the bar lens 30, and at least two LED chips 50 arranged on the circuit board 40. It can be understood that the LED bar lighting 100 with uniform illumination further includes other function modules, such as power supply module, water-proof module, end caps mounted on two ends of the LED bar lighting 100 with uniform illumination, and so on, which are well known by these persons skilled in the art and no need to described in detail.

The bar house 10 is a groove and includes a receiving chamber 101 for receiving the power supply module, a bottom portion 102 for placing the bar lens 30, and two side walls 103 spaced apart from each other and arranged on the bottom portion 102. The bar house 10 may be made of metal material or non-metallic material. However, for heat dissipation, the bar house 10 is made of metal material, such as aluminum alloy, and is metal stamping. The receiving chamber 101 has same dimension and form with the power supply module so as to receive the power supply module and achieve the purpose of convenience and beauty. In the present embodiment, the receiving chamber 101 has a rectangle cross-section so that the power supply module also has a rectangle cross-section for cooperating with the receiving chamber 101. The bottom portion 102 may share an edge with the receiving chamber 101 so as to deduce the volume of the bar house 10. The two side walls 103 are arranged on both sides of the bottom portion 102 so as to form a gap for mounting the bar lens 30. The two side walls 103 provide a number of inner slots 104 thereon and outer slots 105 thereon respectively. The inner slots 104 and the outer slots 105 are respectively configured for inserting the bar lens 30 and the cover 20.

The LED chips 50 are light emitting diodes which are well known by a person skilled in the art. Each of the LED chips 50 includes an optical axis 51. The optical axis 51 is a guide for light distribution design and a center line of one of the LED chips 50. The LED bar lighting 100 with uniform illumination includes at least two LED chips 50 for forming a bar-shaped structure. In the present embodiment, the LED bar lighting 100 with uniform illumination includes a plurality of LED chips 50, such as more than 30.

The cover 20 is mounted on the outer side of the two side walls 103 of the bar house 10, specifically, the cover 20 is inserted into the outer slots 105 of the bar house 10. The cover 20 has at least two functions, and one is to protect the bar lens 30 and the LED chips 50, the other is to distribute the emitting light of the bar lens 30 so as to make it more uniform and avoid some drawback of the LED chips 50. And so, the cover 20 has a light transmittance of less than 1. In a cross section perpendicular to an axial direction of the bar lens 30, the cover 20 may have a random shape, such as semicircular arcs, squares, etc., and customized shapes according to the requirements. In the present embodiment, the cover 20 has a square shaped in the cross section perpendicular to the axial direction of the bar lens 30. The cover 20 is axially symmetrical with respect to the optical axis 51 of the LED chips 50 at the cross section perpendicular to the axial direction of the bar lens 30. The axial axis of symmetry of the cover 20 is overlapped to the optical axis 51 of the LED chips 50 to facilitate the light distribution design.

Referring to FIG. 3 together, the bar lens 30 is inserted into the inner sides of the two sides walls 103 of the bar house 10, specifically, the bar lens 30 is inserted into the inner slots 104 of the bar house 10. The bar lens 30 includes a lens portion 31, two support portions 315, and two mounting portions 32, each support portion has a constant thickness, each mounting portion 32 is connected to a support portion 315, arranged two sides of the lens portion 31 respectively. In the cross section perpendicular to the axial direction of the bar lens 30, the lens portion 31 includes an in-light surface profile line 311 and an out-light surface profile line 314 spaced apart from the in-light surface profile line 311. The in-light surface profile line 311 has an axis of symmetry of the optical axis 51 of the LED chips 50 and includes a first arc 312 and two second arcs 313 arranged two sides of the first arc 312. The first arc 312 and two second arcs 313 form a continuous convex surface. Therefore, when the bar lens 30 is mounted onto the circuit board 40, the optical axis 51 of the LED chip 50 and the axis of symmetry of the strip lens 30 coincide with each other in the cross section perpendicular to the axial direction of the bar lens 30. The first arc 312 is tangent to the two second arcs 313, respectively, and the radius R of the first arc 312 is smaller than the radius r of the second arcs 312. As is well known, the LED chips 50 has a maximum luminous flux in the range of the light-emitting angle around the optical axis 51. The first arc 312 can disperse the light in the range so that the light intensity in the range can be reduced and deflects part of the light toward the side walls of the cover 20. The radius of the second arcs 313 is larger than that of the first arc 312 due to the fact that the larger the angle of the light and the optical axis 51 is, the smaller the luminous flux thereof is in the cross section taken along the optical axis 51 so as to reduce the ability to disperse light. The out-light surface profile line 314 also has an axis of symmetry on the optical axis 51 and the radius of the out-light surface profile line 314 gradually decreases toward both sides from the intersection of the out-light surface profile line 312 and the optical axis 51. The gradual reduction may be linearly reduced or decreased in accordance with a certain proportion in order to achieve the purpose of light distribution. Specifically, the light rays are irradiated along the light path of the light emitted from the first arc 312 of the in-light surface profile line 311 at and near the intersection of the out-light surface profile line 314 and the optical axis 51. However, the emitted light after refraction of the in-light surface profile line 311 is further refracted toward both sides of the cover 20 as the radius of the out-light surface profile line 314 decreases so that both sides of the cover can capture more light rays than the center thereof. As a result, it may cause the emitted light of the entire cover 20 to reach a uniform illumination. In the actual light distribution, the radius of the out-light surface profile line 314 should be infinite at the intersection of the out-light surface profile line 314 and the optical axis 51 so that as much light as possible is irradiated along the light path of the light emitted from the first arc 312 of the in-light surface profile line 311. However, the refraction angle at both end points of the out-light surface profile line 314 is 0 degree so as that the emitted light from both end points of the out-light surface profile line 314 is directed to the boundary between the bar house 10 and the cover 20.

The two mounting portions 32 are provided on the two end of the out-light surface profile line 314 in the cross section perpendicular to the axial direction of the bar lens 30, respectively. The two mounting portions 32 are inserted in the bar house 10, specifically, it are inserted into the inner slots 104 of the bar house 10. For easy of assembly, the inner walls of the two mounting portions 32 is provided with a platform 321 for inserting the circuit board 40 so that the circuit board 40 is interposed between the two mounting portions 32.

The circuit board 40 may be a printed circuit board (PCB) on which a circuit or other electronic component, such as a diode, a transistor, or the like, is provided to give the LED chip 50 a current or control signal.

As described above, since the bar lens 30 of the LED bar lighting 100 with uniform illumination has the in-light surface profile line 311 and the out-light surface profile line 314 in the cross section perpendicular to the axial direction of the bar lens 30, and the shape of the in-light surface profile line 311 and the out-light surface profile line 314 are optically designed so that the luminous flux in the vicinity of the optical axis 51 of each of the LED chips 50 is dispersed onto both sides. As a result, the light intensity of the middle portion of the cover 30 can be reduced and the light intensity of the both sides of the cover 30 is increased so that the LED bar lighting may have a uniform illumination.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An LED bar lighting with uniform illumination, comprising:
at least two LED chips (50) which are arranged in a row, each of the at least two LED chips (50) having an optical axis (51); and
a bar lens (30) mounted on top of the at least two LED chips (50), the bar lens (30) comprising a lens portion (31), two supporting portions connected to both end of the lens portion, and two mounting portions, each mounting portion connected to a supporting portion, and the lens portion (31) comprising an in-light surface profile line (311) and an out-light surface profile line (314) in a cross section perpendicular to the axial direction of the bar lens (30), the in-light surface profile line (311) having an axis of symmetry of the optical axis of the LED chips (50) and comprising a first arc (312) and two second arcs (313) arranged on two sides of the first arc (312), the first arc and two second arcs forming a continuous convex surface, the first arc (312) being tangent to the second arc (314) and the radius of the first arc (312) being smaller than that of the second arc (314), the out-light surface profile line (314) having an axis of symmetry of the optical axis (51) of the LED chips (50), the radius of the out-light surface profile line (314) being gradually reduced toward two sides thereof from an intersection of the out-light surface profile line (314) and the optical axis (51), the radius of the out-light surface profile line (314) at the intersection of the out-light surface profile line (314) and the optical axis (51) being infinite, the refraction angle at both end points of the out-light surface profile line (314) being 0 degree.

2. The LED bar lighting with uniform illumination as claimed in claim 1, wherein the bar lens (30) comprises two mounting portions (32), the two mounting portions (32) are disposed on the two end points of the out-light surface profile line (314) at the cross section perpendicular to the axial direction of the bar lens (30).

3. The LED bar lighting with uniform illumination as claimed in claim 2, wherein the LED bar lighting with uniform illumination further comprises a bar house (10), the two mounting portions (32) are inserted in the bar house (10).

4. The LED bar lighting with uniform illumination as claimed in claim 2, wherein the LED bar lighting with uniform illumination further comprises a circuit board (40) configured for disposing the LED chips (50), the circuit board (40) is inserted between the two mounting portions (32).

5. The LED bar lighting with uniform illumination as claimed in claim 1, wherein the LED bar lighting with uniform illumination further comprises a bar house (10), and a cover (20) mounted on the bar house (10), the light emitted from the two end points of the out-light surface profile line (314) is directed to the boundary of the bar house (10) and the cover (20).

6. The LED bar lighting with uniform illumination as claimed in claim 1, wherein in the cross section perpendicular to the axial direction of the bar lens (30), the cover (20) has an axis of symmetry of the optical axis (51) of the LED chips (50).

7. The LED bar lighting with uniform illumination as claimed in claim 6, wherein the axial axis of symmetry of the cover (20) coincides with the optical axis (51) of the LED chips (50).

8. The LED bar lighting with uniform illumination as claimed in claim 7, wherein in the cross section perpendicular to the axial direction of the bar lens (30), the optical axis (51) of the LED chips (50) is overlapped to the axis of symmetry of the bar lens (30).

* * * * *